United States Patent [19]

Hanley et al.

[11] Patent Number: 5,771,452
[45] Date of Patent: Jun. 23, 1998

[54] SYSTEM AND METHOD FOR PROVIDING CELLULAR COMMUNICATION SERVICES USING A TRANSCODER

[75] Inventors: Donald V. Hanley, McKinney; Jerry J. Parker, Richardson, both of Tex.

[73] Assignee: Northern Telecom Limited, Montreal, Canada

[21] Appl. No.: 547,297

[22] Filed: Oct. 25, 1995

[51] Int. Cl.$^6$ .................................. H04Q 7/22
[52] U.S. Cl. .................... 455/445; 455/450; 455/560; 370/336
[58] Field of Search .................... 455/445, 450, 455/454, 560, 436, 439, 442; 370/328, 335, 336, 337, 340, 351–353, 355–358

[56] References Cited

U.S. PATENT DOCUMENTS

| | | | |
|---|---|---|---|
| 4,688,211 | 8/1987 | Van Simaeys et al. | 370/360 |
| 4,748,655 | 5/1988 | Thrower et al. | 455/461 |
| 4,972,479 | 11/1990 | Tobias, Jr. et al. | 380/33 |
| 5,101,501 | 3/1992 | Gilhousen et al. | 455/442 |
| 5,251,053 | 10/1993 | Heidermann | 359/145 |
| 5,267,261 | 11/1993 | Blakeney, II et al. | 370/332 |
| 5,282,244 | 1/1994 | Fuller et al. | 379/230 |
| 5,285,469 | 2/1994 | Vanderpool | 375/200 |
| 5,293,376 | 3/1994 | White | 370/258 |
| 5,297,183 | 3/1994 | Bareis et al. | 455/410 |
| 5,303,287 | 4/1994 | Laborde | 455/426 |
| 5,305,308 | 4/1994 | English | 370/335 |
| 5,325,419 | 6/1994 | Connolly et al. | 455/435 |
| 5,347,562 | 9/1994 | Candy | 455/524 |
| 5,365,590 | 11/1994 | Brame | 380/49 |
| 5,436,900 | 7/1995 | Hammar et al. | 370/336 |
| 5,453,985 | 9/1995 | Ghisler | 370/358 |
| 5,526,397 | 6/1996 | Lohman | 455/560 |
| 5,550,828 | 8/1996 | Gries | 455/436 |
| 5,608,779 | 3/1997 | Lev et al. | 455/436 |

FOREIGN PATENT DOCUMENTS 0 599 657 A2  1/1993  European Pat. Off. ......... H04Q 7/04

OTHER PUBLICATIONS

Masami Yabusaki et al., "Voice Communication Connection Control in Digital Public Land Mobile Networks," Trans. Fundamentals, vol. E75–A, No. 12, Dec. 1992, pp. 1702–1709.

Neil J. Boucher, The Cellular Radio Handbook, 1990, Chapter 10, pp. 137–151.

*Primary Examiner*—Dwayne D. Bost
*Assistant Examiner*—Tracy M. Legree
*Attorney, Agent, or Firm*—Finnegan, Henderson, Farabow, Garrett & Dunner, L.L.P.

[57] ABSTRACT

A cellular communication system and method where a mobile user communicates coded information signals on a radio channel via a cellsite and a cellsite controller to a switching network. The switching network switches the signal to a transcoder which converts the coded signal to an uncoded signal. The uncoded signal is communicated to another user, and may be maintained and remain untouched and uninterrupted during handoffs.

25 Claims, 6 Drawing Sheets

SYSTEM AND METHOD FOR PROVIDING CELLULAR COMMUNICATION SERVICES USING A TRANSCODER

BACKGROUND OF THE INVENTION

The present invention relates to cellular communication systems. More particularly, the present invention relates to a cellular communication system using a transcoder for providing digital cellular communications.

Conventional cellular systems provide radio communications over a service area using an allocated frequency band divided into radio channels. The service area is divided geographically into cells. Each cell contains an associated cellsite providing radio communications for the cell.

FIG. 1 is block diagram illustrating a conventional cellular system 100. For purposes of simplicity, some well-known system components are omitted. Conventional cellular system 100 includes a switching network 105 coupled to a switch control processor 107 providing call processing and administrative functions for the system. Switching network 105 is coupled to at least one public switch telephone network (PSTN) 112 via a PSTN interface controller 114 which supports speech and signalling interfacing to PSTN 112.

System 100 further includes a plurality of geographically-spaced cellsites 115. Each cellsite 115 includes, inter alia, a radio transceiver (not shown) for establishing radio communications with a mobile user 120. Cellsites 115 are grouped into clusters 125 of one or more cellsites. Each cluster 125 has an associated cellsite controller 110 which manages all cellsites within the cluster. To accomplish this, all cellsites 115 within a given cluster 125 are coupled to the associated cellsite controller 110 via connections 117. Cellsite controllers 110 are coupled to switching network 105 via connections 118.

To support standards employing coded information signals (e.g., VSELP coding in Time Division Multiple Access (TDMA), QSELP coding in Code Division Multiple Access (CDMA)), conventional cellular system 100 may also include transcoders which, e.g., convert optimized speech coding to pulse control modulation (PCM) as used in a conventional PSTN.

For example, system 100 may be configured with transcoders co-located with and connected to each cellsite 115. For purposes of simplicity, FIG. 1 illustrates a single transcoder 140' connected to cellsite 115' via a connection 145'. In a typical application, however, a plurality of transcoders would be connected to each cellsite. In this configuration, for example, the transceiver of cellsite 115' communicates coded speech with mobile user 120'. Connection 117' carries PCM (uncoded signals) between cellsite controller 110' and the cellsite 115'. The coded speech is converted to and from PCM directly at cellsite 115'.

While co-location of transcoders and cellsites illustrated in FIG. 1 allows most components of system 100 to remain ignorant of the specific speech coding technology being used at the cellsite, natural voice compression available in coded speech is not fully exploited to reduce infrastructure needed to support the system. For example, each speech channel (not shown) of connection 117' is able to carry only a single conversation between cellsite controller 110' and cellsite 115'.

Moreover, in the configuration illustrated in FIG. 1, transcoders cannot be shared between cellsites to accommodate variances in digital cellular traffic throughout the network. Thus, to provide a proper grade of service to mobile users communicating coded information signals, each cellsite 115 must be equipped with enough transcoders to handle the maximum number of such users expected to be communicating via the cellsite at any given time. Additionally, because transcoders cannot be shared between cellsites, "soft handoffs," which use simultaneous communication links between a mobile user and a transcoder via separate cellsites, are not supported.

Alternatively, system 100 may be configured to include one or more transcoders co-located with and connected to each cellsite controller 110. FIG. 2 is block diagram illustrating the conventional cellular system of FIG. 1 in this alternate configuration. For purposes of simplicity, FIG. 2 illustrates a single transcoder 140" connected to cellsite controller 110" via a connection 145". In a typical application, however, a plurality of transcoders would be connected to each cellsite controller. In this configuration, each transcoder supports all cellsites 115 within cluster 125".

In this configuration, for example, coded speech is communicated between mobile user 120" and cellsite controller 110" via cellsite 115" and connection 117". The coded speech is converted to and from PCM at cellsite controller 110". Depending on the particular compression algorithm used, each speech channel (not shown) of connection 117" can carry multiple conversations, reducing infrastructure needed to support the system. For example, in a system using a TDMA standard, three conversation per channel are supportable in full-rate mode and six conversations per channel are supportable in half-rate mode. Other portions of the system, however, fail to fully exploit the voice compression available in coded speech.

Moreover, to provide a proper grade of service to mobile users communicating coded information signals, cellsite controller 110" must be equipped with enough transcoders to handle the maximum number of such users expected to be using any cellsites 115 within cluster 125" at any given time. Because the cellsites 115 of cluster 125" share transcoders, variances in digital cellular traffic within the cluster can be balanced between cellsites, thus requiring fewer transcoders to provide a particular grade of service relative to the system of FIG. 1. Cellsites in different clusters, however, do not share transcoders.

Since the same transcoder is accessible by all cellsites 115 within cluster 125", limited "soft handoff" between different cellsites of the same cluster is supported. "Hard handoff" is still required between adjacent clusters or systems, however, requiring switching network 105 to allocate a new transcoder and switch the network path in order to hand off a mobile user to a cellsite in a new cluster.

Accordingly, there remains a need for a cellular communication system and method which lessens the amount of infrastructure and reduces the number of transcoders necessary to provide a particular grade of services to mobile users communicating coded information signals. Moreover, there remains a need for a cellular communication system and method supporting "soft handoff" between cellsites of adjacent clusters or adjacent systems.

SUMMARY OF THE INVENTION

Accordingly, the present invention is directed to a cellular communication system and method providing digital cellular communications that substantially obviates one or more of the problems due to limitations and disadvantages of the prior art.

It is an object of the present invention to provide a cellular communication system and method that further exploits voice compression available in coded speech.

It is another object of the present invention to provide a cellular communication system and method that reduces the number of transcoders needed to provide a given grade of service to mobile users communicating coded information signals.

It is yet another object of the present invention to provide a cellular communication system and method supporting "soft handoff" between cellsites of adjacent clusters or adjacent systems.

Additional objects and advantages of the invention will be set forth in part in the description which follows, and in part will be obvious from the description or may be learned by practice of the invention. The objects and advantages of the invention will be realized and attained by means of the elements, method steps, and combinations particularly pointed out in the appended claims.

To achieve the objects and in accordance with the purpose of the invention, as embodied and broadly described herein, the invention comprises a method of communicating information signals between a mobile user and another user in a cellular communication system comprising a switching network connected to a system controller, a plurality of geographically-spaced cellsites grouped into a plurality of clusters. A cellsite controller is associated with each of the clusters. Each of the cellsite controllers is coupled to each cellsite in the associated cluster and each of the cellsite controllers is coupled to the switching network. The cellular communication system further comprises a transcoder connected to the switching network. The switching network is configured such that the transcoder is accessible to any of the cellsites.

The method comprises the steps of communicating a coded information signal from the mobile user to a first cellsite on a first radio channel and communicating the coded information signal from the first cellsite to a first cellsite controller coupled to the first cellsite. The coded information signal is subjected to rate adaption between the first cellsite controller, and the switching network and is switched to the transcoder via a switch connection. The coded information signal is converted to an uncoded information signal and is communicated to the other user.

Furthermore, as embodied and broadly described herein, the invention comprises a cellular communication system for communicating information signals between a mobile unit and another unit. The system comprises a switching network, a switch control processor connected to the switching network, and a plurality of geographically-spaced cellsites. The cellsites are grouped into a plurality of clusters. The system further comprises a cellsite controller associated with each of the clusters and a transcoder. Each of the cellsite controllers is coupled to each cellsite in the associated cluster. Each of the cellsite controllers is also coupled to the switching network. The switching network is configured such that the transcoder is accessible to any of the cellsites.

Both the foregoing general description and the following detailed description are exemplary and explanatory only, and are not restrictive of the invention, as claimed.

BRIEF DESCRIPTION OF THE DRAWINGS

The accompanying drawings, which are incorporated in and constitute a part of this specification, illustrate an embodiment of the invention and together with the description, serve to explain the principles of the invention. In the drawings.

DESCRIPTION OF THE PREFERRED EMBODIMENT

Reference will now be made in detail to the present preferred embodiment of the invention, an example of which is illustrated in the accompanying drawings. Wherever possible, the same reference numbers will be used throughout the drawings to refer to the same or like parts.

Figure 1:
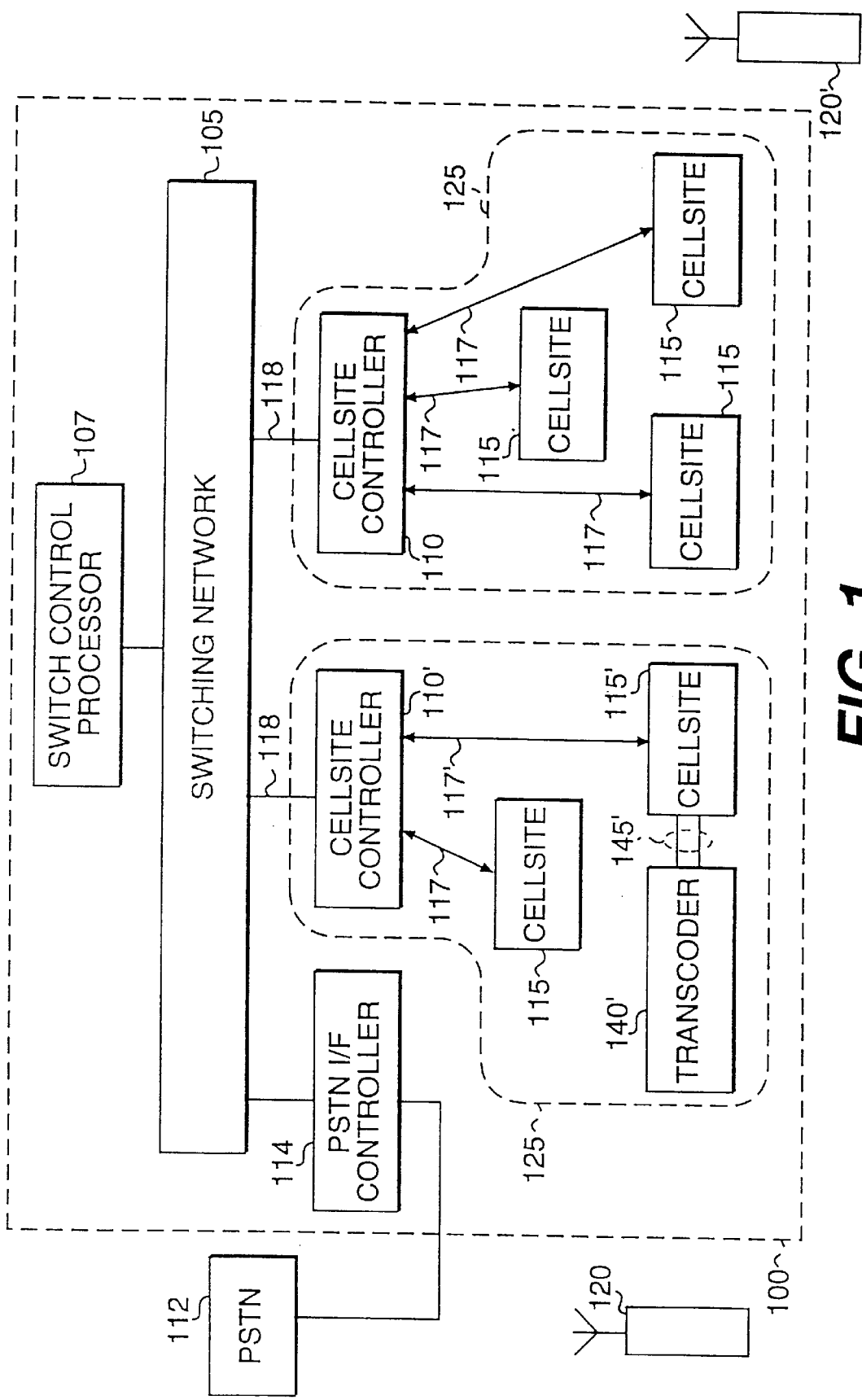
FIG. 1 is a block diagram illustrating a conventional cellular system.
Figure 2:
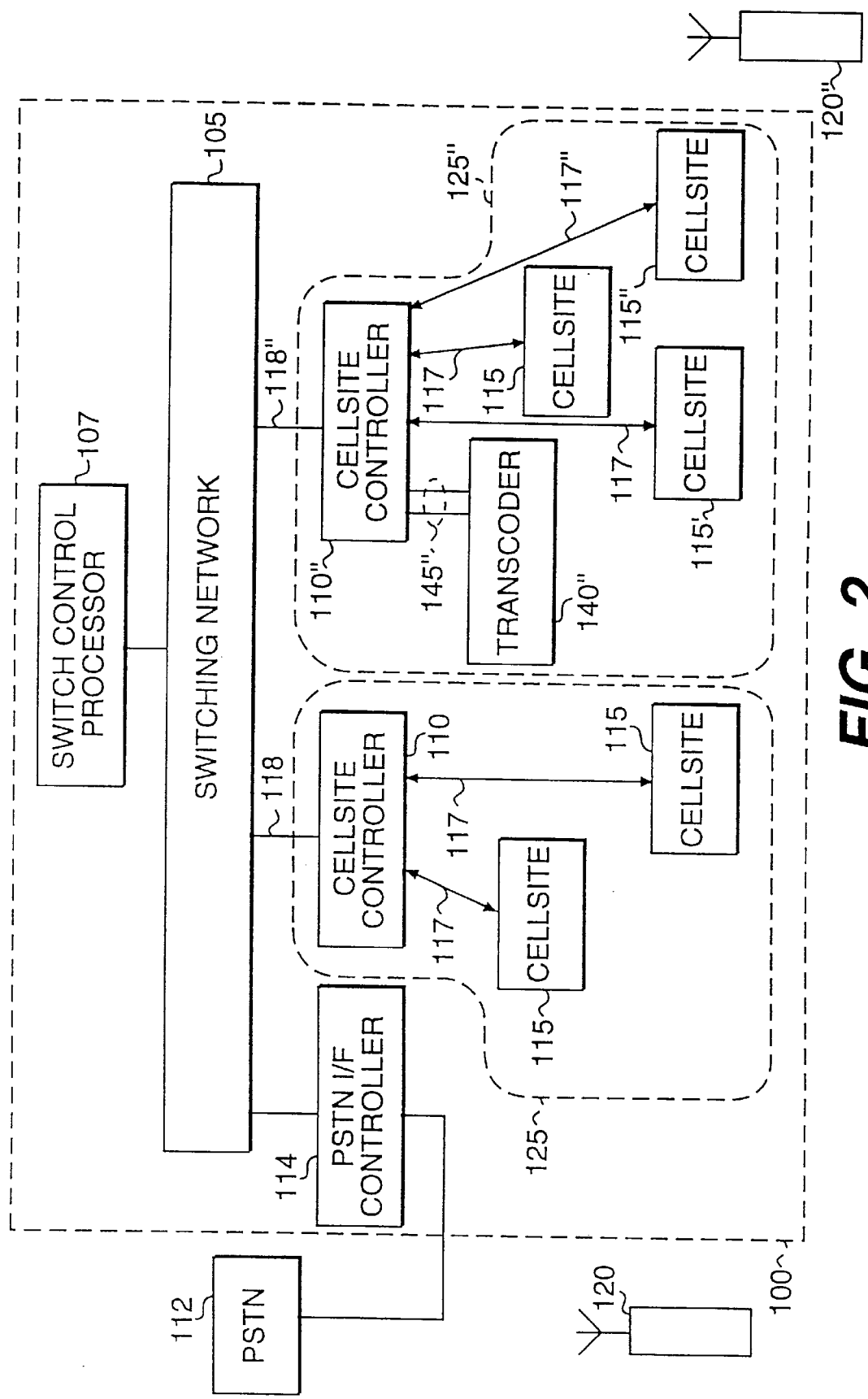
FIG. 2 is block diagram illustrating the conventional cellular system of FIG. 1 in an alternate configuration.
Figure 3:
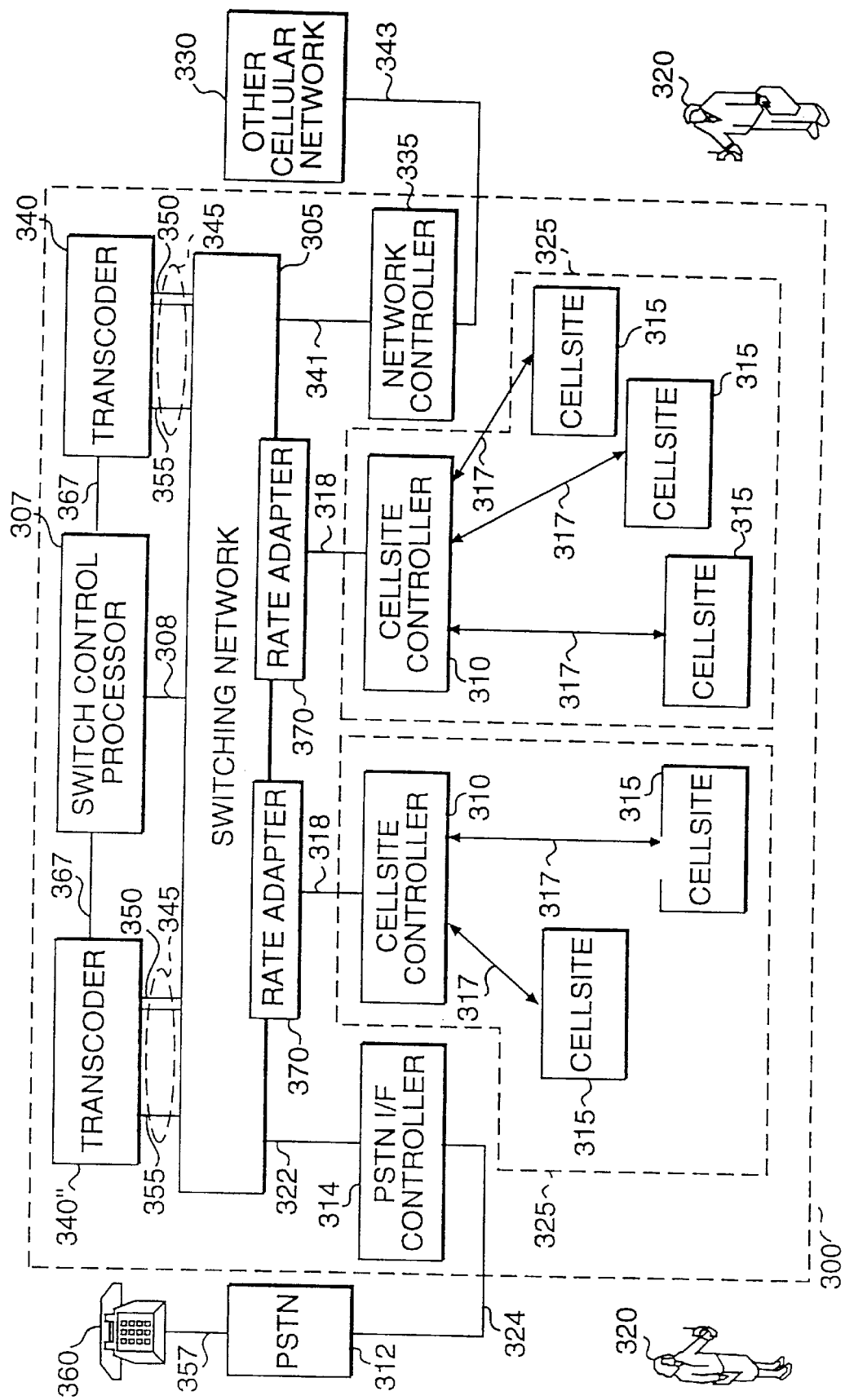
FIG. 3 is a block diagram illustrating the cellular communication system of the present invention.

The communication system of the present invention is shown in FIG. 3 and is designated generally by reference numeral 300. Communication system 300 provides radio communications over a service area using an allocated frequency band divided into radio channels. Preferably, communication system 300 supports standards and conventions of a TDMA cellular system and a standard Advanced Mobile Telephone (AMPS) system for backwards compatibility. Alternatively, communication system 300 may support a CDMA system and an AMPS system. Many of the details of communication system 300 are well known in art and are not specifically pertinent to the present invention. Therefore, some such details have been omitted for purposes of clarity.

As embodied herein and referring to FIG. 3, communication system 300 includes a switching network 305 coupled to a switch control processor 307 via a connection 308. Switching network 305 provide switch connections between system components for providing communication services. Switch control processor 307 provides call processing and administrative functions for the system.

Switching network 305 is coupled to at least one public switch telephone network (PSTN) 312 for, inter alia, establishing communications with an other user 360 of PSTN 312 via a connection 357. For purposes of simplicity, details of PSTN 312 and connection 357 are omitted. It is understood, however, that PSTN 312 is preferably capable of providing connections to many users 360 in diverse geographic locations via many existing systems and switches (not shown).

Switching network 305 is coupled to PSTN 312 via a PSTN interface controller 314 and connections 322 and 324. PSTN interface controller 314 supports speech and signalling interfacing to PSTN 312. Switching network 305 may also be coupled to other cellular networks 330 via connections 341 and 343 and a network interface controller 335 which supports connections between switching network 305 and the rest of the cellular network.

Switching network 305 and switch control processor 307 are preferably comprised of a mobile telephone switching office (MTSO), mobile telephone switching center (MTSC), or mobile telephone exchange (MTX), as are known in the art. For example, switching network 305 and switch control processor 307 may comprise a DMS-MTX system controller, as is commercially available from Northern Telecom, Ltd.

System 300 further includes a plurality of geographically-spaced cellsites 315. In a typical application, system 300 would include a large number of cellsites 315. Because system operation is essentially the same with few or many cellsites, however, this description references five cellsites 315. Each cellsite 315 includes, inter alia, a radio transceiver (not shown) for establishing radio communications with a mobile user 320. Cellsites 315 are grouped into clusters 325 of one or more cellsites. Each cluster 325 has an associated cellsite controller 310 which manages all cellsites within the cluster. To accomplish this, all cellsites 315 within a given cluster 325 are coupled to the associated cellsite controller 310 via connections 317, which comprise a data transmission system such as, for example, a microwave link, optical fibers, or wires, as are known in the art.

Likewise, cellsite controllers 310 are coupled to switching network 305 via connections 318 and rate adapters 370. Preferably, at least some communication channels (not shown) of connections 317 and 318 carry multiple conversations (or information signals) utilizing voice compression available in coded speech. For communication channels (not shown) of connections 318 carrying multiple conversations (or information signals), rate adapters 370 split the multiple conversations (or signals) into separate conversations (or signals) for switching via network 305. Likewise, in the reverse direction, rate adapters 370 combine separate conversations (or signals), from network 305 to connection 318. Particularly, the three 16 Kb signals of each of the 64 Kb channels are combined to provide a single 64 Kb channel with three 16 Kb signals. Rate adapters 370 preferably may be constructed to include multiplexing techniques and hardware as is known in the art.

System 300 further includes a plurality of transcoders 340 connected to switching network 105 via connections 345 and controlled by switch control processor 107 via connections 367. Each connection 345 comprises a first connection 350 and a second connection 355. In a typical application, system 300 would include a large number of transcoders 340. Because system operation in essentially the same with few or many transcoders, however, this description references two transcoders 340. Transcoders 340 function to convert coded information signals. For example, transcoders 340 function to convert TDMA, CDMA, or adaptive differential PCM (ADPCM) coded signals at connection 350 to and from PCM signals at connection 355. Alternatively, transcoders 340 convert data signals such as, e.g., asynchronous data communications and fax signals. Because transcoders 340 are each connected to switching network 305, the transcoders act as a common pool of resources accessible to any mobile user 320 communicating via system 300.

To support an CDMA "soft handoff" function, system 300 may further include one or more selectors (not shown) operating in conjunction with transcoders 340. Soft handoff is further described in U.S. Pat. No. 5,101,501 of Qualcomm Inc. entitled "Method And System For Providing A Soft Handoff In Communication In A CDMA Cellular Telephone System." The selector, as well as the AMPS/TDMA "soft handoff" function, are further described in U.S. patent application of Donald V. Hanley, entitled "Cellular Communication System and Method Providing Improved Handoff Capability," filed on the same date herewith, and which is incorporated herein by reference. Because transcoders 340 of system 300 are connected to switching network 305 which provides switching functions for all cellsites 315, "soft handoff" between cellsites 315 of different clusters 325 is supported.

Even if a "hard handoff" is required (e.g., for handoffs between a cellsite 315 of system 300 and a cellsite (not shown) of other network 330), switch control processor 307 preferably controls switching network 305 to utilize a single transcoder 340" for the entire duration of the mobile communication. Thus, for example, a switch connection between transcoder 340" and PSTN interface controller 314 (i.e., the "call leg") may be maintained and completely untouched for the duration of an entire call even when handoffs occur, and regardless of numerous or distant handoffs. Thus, call processing services operating on the call leg are unaffected by handoffs, improving system performance and simplifying operation of switch control processor 307.

Figure 4A:
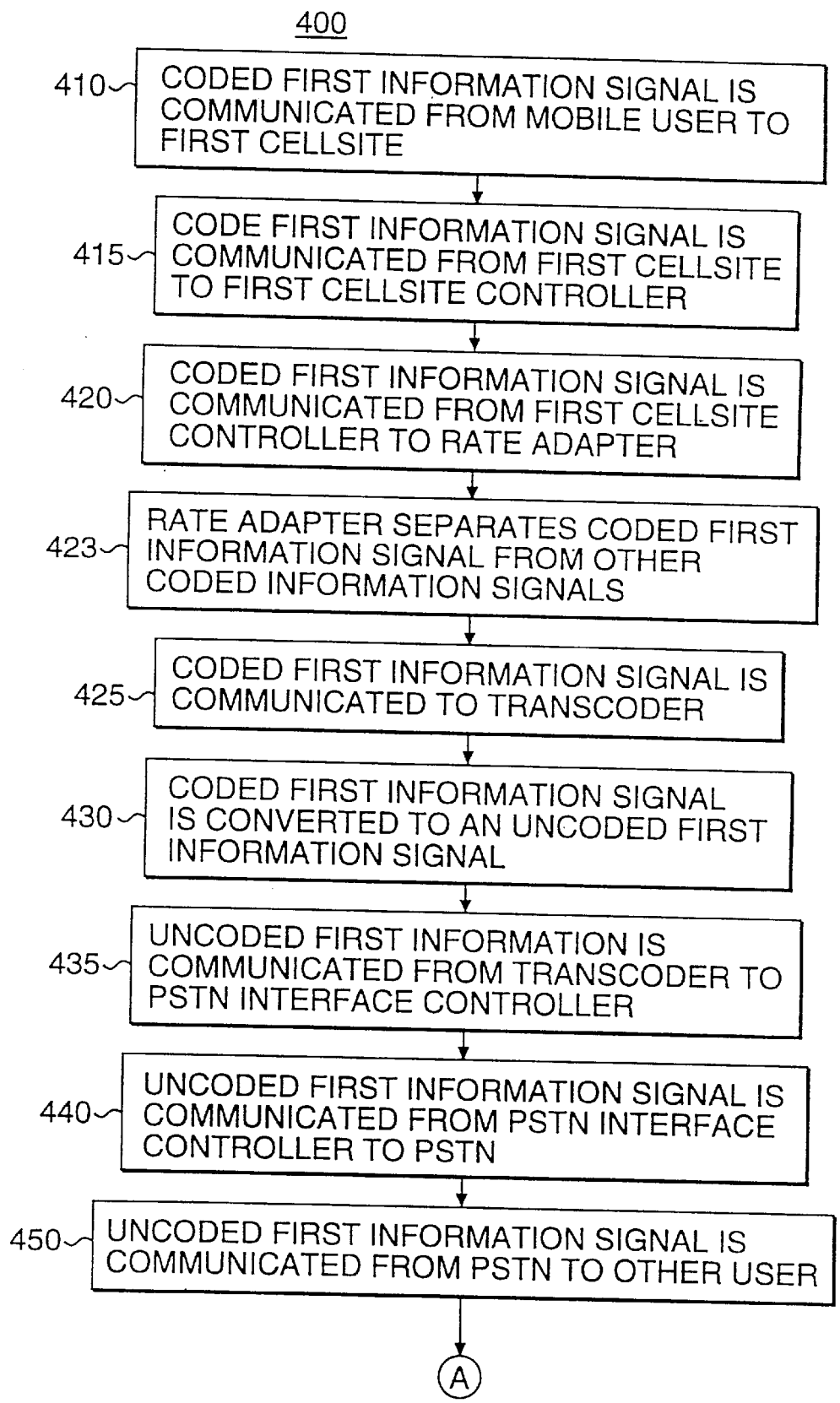
FIGS. 4A and 4B is a flowchart illustrating a preferred communication method of the present invention.
Figure 4B:
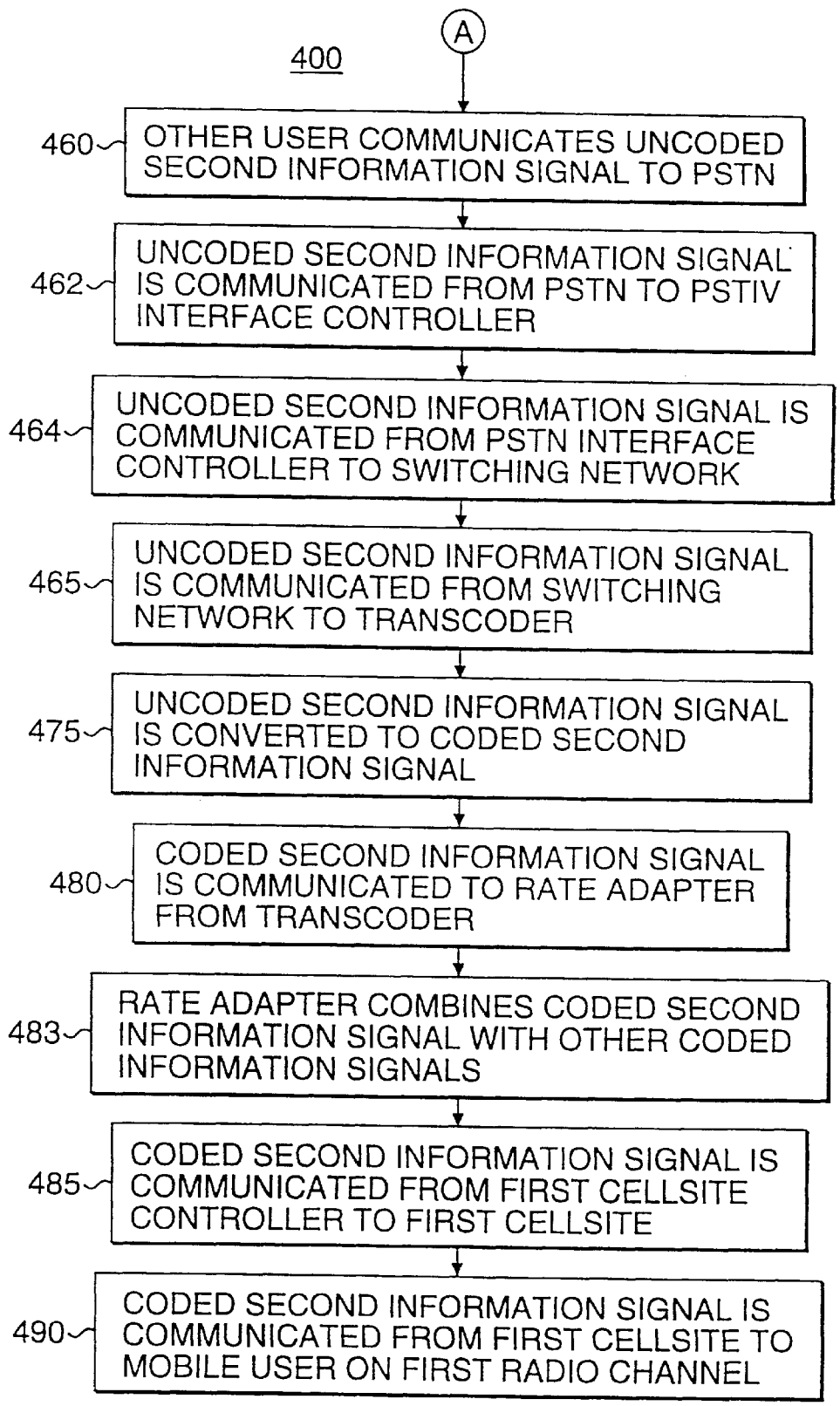
Figure 5:
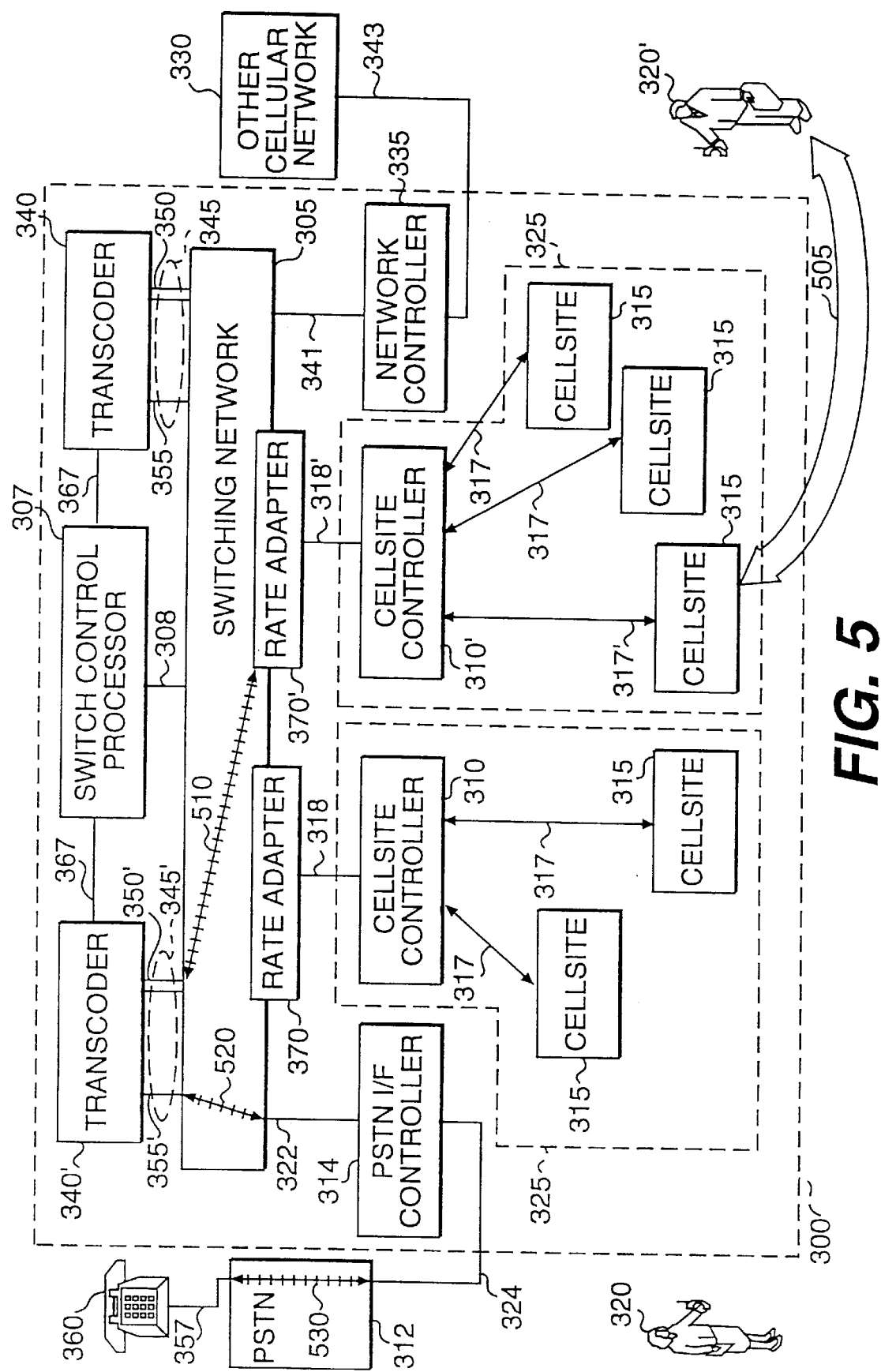
FIG. 5 is a block diagram illustrating the cellular communication system of FIG. 3 configured for bi-directional communication.

FIG. 5 is a block diagram illustrating the cellular communication system of the FIG. 3, wherein the system is configured for bi-directional communication between a mobile user 320' and other user 360 via a cellsite 315' on a first radio channel (as illustrated by an arrow 505), a connection 317', a cellsite controller 310', a connection 318', a rate adapter 370, switching network 305, a first cellular switch connection 510, a first connection 350', a transcoder 340', a second connection 355', a second cellular switch connection 520, connection 322, PSTN interface controller 314, connection 324, PSTN 312, a first PSTN switch connection 530, and connection 357. FIG. 4 is a flowchart illustrating a preferred method of communicating information signals between mobile user 320' and other user 360 using system 300 as configured in FIG. 5.

Referring to FIG. 4, the method is designated generally as 400. In the communication method, a coded first information signal is communicated from mobile user 320' to first cellsite 315' on a first radio channel. (Step 410). The coded first information signal may be, e.g., a TDMA, CDMA, or ADPCM coded information signal, or any type of data information signal. The coded first information signal is then communicated from cellsite 315' to cellsite controller 310' via a first communication channel of connection 317'. (Step 415).

The coded first information signal is further communicated from cellsite controller 310' to rate adapter 370' via a first communication channel of connection 318' (Step 420). Rate adapter 370' separates the coded first information signal from other coded information signals (Step 423) and communicates it to first connection 350' of transcoder 340' via first switch connection 510 of switching network 305. (Step 425). Transcoder 340' converts the coded first information signal to an uncoded first information signal (step 430) which is output via second connection 355' to switching network 304. (Step 430). For example, transcoder 340' converts a TDMA information signal input at first connection 350' to a PCM information signal which is output at second connection 355'.

The uncoded first information signal is then communicated from connection 355' to connection 322 via second switch connection 520 of switching network 305. (Step 435). The uncoded first signal is then communicated to PSTN 312 via PSTN interface controller 314 and connection 324. (Step 440), where it is then communicated to other user 360 via a first switch connection 530 of PSTN 312. (Step 450).

In the reverse direction, other user 360 communicates a second information signal to switching network 305 via connection 357, first switch connection 530 of PSTN 312. (Step 460). The uncoded second information signal is communicated from PSTN 312, connection 324 and PSTN interface controller 314. (Step 462). The uncoded second information is then communicated from PSTN interface controller 314 to connection 322. (Step 464). The second information signal is then communicated from connection 322 to second connection 355' of transcoder 340' via second switch connection 520 of switching network 305. (Step 465). Transcoder 340' converts the uncoded second information signal to a coded second information signal which is output via first connection 350' to switching network 304. (Step 475). For example, transcoder 340' converts a PCM information signal input at second connection 355' to a TDMA information signal which is output at first connection 350'.

The coded second information signal is communicated from first connection 350' to rate adapter 370' via first switch connection 510 of switching network 305 (Step 480). Rate adapter 370 combines the coded second information signal with other coded information signals (Step 483) and communicates it to connection 318', where it is then communicated from cellsite controller 310' to cellsite 315' via the first communication channel of connection 317'. (Step 485). From cellsite 315', the coded second information signal is communicated to mobile user 320' on the first radio channel. (Step 490).

In the preferred method, coded first information signal and uncoded second information signal are communicated simultaneously.

It will be apparent to those skilled in the art that various modifications and variations can be made in the computer system and method of the present invention without departing from the scope or spirit of the invention. Moreover, other embodiments of the invention will be apparent to those skilled in the art from consideration of the specification and practice of the disclosed invention herein. The specification and examples are thus only exemplary, with the true scope and spirit of the invention being indicated by the following claims.

What is claimed is:

1. In a cellular communication system having a switching network connected to a system controller, a plurality of geographically-spaced cellsites grouped into a plurality of clusters, a cellsite controller associated with each of said clusters, and a transcoder connected to said switching network, wherein each of said cellsite controllers is coupled to each cellsite in the associated cluster and each of said cellsite controllers is coupled to said switching network, wherein said switching network is configured such that said transcoder is accessible to any of said cellsites, a method of communicating information signals between a mobile user and another user comprising:

communicating a coded information signal from said mobile user to a first one of said cellsites on a first radio channel;

communicating said coded information signal from said first cellsite to a first one of said cellsite controllers coupled to said first cellsite;

communicating said coded information signal from said first cellsite controller to said switching network via a rate adapter and a communication channel carrying multiple coded information signals;

switching said coded information signal to said transcoder via a switch connection of said switching network;

converting said coded information signal to an uncoded information signal; and communicating said uncoded information signal to said other user.

2. The method of claim 1, wherein said uncoded information signal is communicated to said other user via a second switch connection of said switching network.

3. The method of claim 2, wherein said uncoded information signal is communicated to said other user via a PSTN interface controller.

4. The method of claim 2, wherein said coded information signal is communicated from said first cellsite to said first cellsite controller via a communication channel carrying multiple coded information signals.

5. The method of claim 2, further comprising the steps of:

communicating an uncoded second information signal from said other user to said switching network;

switching said uncoded second information signal to said transcoder via said second switch connection;

converting said uncoded second information signal to a coded second information signal;

communicating said coded second information signal to said first cellsite controller via said switch connection;

communicating said coded second information signal from said first cellsite controller to said first cellsite; and communicating said coded second information signal from said first cellsite to said mobile user on said first radio channel.

6. The method of claim 5, wherein said coded information signal is communicated from said switching network to said first cellsite controller via a rate adapter and a communication channel carrying multiple coded information signals.

7. The method of claim 6, wherein said coded second information signal is communicated from said first cellsite controller to said first cellsite via a communication channel carrying multiple coded information signals.

8. The method of claim 6, wherein said coded information signal and said coded second information signal are TDMA coded signals.

9. The method of claim 6, wherein said coded information signal and said coded second information signal are CDMA coded signals.

10. The method of claim 5, wherein said coded information signal and said uncoded second information signal are communicated simultaneously.

11. The method of claim 5, wherein said uncoded information signal and said uncoded second information signal are PCM signals.

12. The method of claim 5, wherein said coded information signal and said coded second information signal are asynchronous data communication signals.

13. In a cellular communication system having a switching network connected to a system controller, a plurality of geographically-spaced cellsites grouped into a plurality of clusters, a cellsite controller associated with each of said clusters, and a transcoder connected to said switching network, wherein each of said cellsite controllers is coupled to each cellsite in the associated cluster and each of said cellsite controllers is coupled to said switching network, wherein said switching network is configured such said transcoder is accessible to any of said cellsites, a method of communicating information signals between a mobile user and another user comprising:

communicating a coded information signal from said mobile user to a first one of said cellsites on a first radio channel;

communicating said coded information signal from said first cellsite to a first one of said cellsite controllers coupled to said first cellsite;

communicating said coded information signal from said first cellsite controller to said switching network via a rate adapter;

switching said coded information signal to said transcoder via a switch connection of said switching network;

converting said coded information signal to an uncoded information signal, said uncoded information signal being a PCM signal; and communicating said uncoded information signal to said other user via a second switch connection of said switching network and a PSTN interface controller;

communicating an uncoded second information signal from said other user to said switching network via said PSTN interface controller, said uncoded second information signal being a PCM signal;

switching said uncoded second information signal to said transcoder via said second switch connection;

converting said uncoded second information signal to a coded second information signal, said coded second information signal being a TDMA coded signal;

communicating said coded second information signal to said first cellsite controller via said switch connection and said rate adapter;

communicating said coded second information signal from said first cellsite controller to said first cellsite; and communicating said coded second information signal from said first cellsite to said mobile user on said first radio channel;

wherein said coded information signal and said uncoded second information signal are communicated simultaneously.

14. The method of claim 13, wherein:

said coded information signal is communicated from said first cellsite to said first cellsite controller and said coded second information signal is communicated from said first cellsite controller to said first cellsite via a communication channel carrying multiple coded information signals; and wherein said coded information signal is communicated from said first cellsite controller to said switching network and said coded second information signal is communicated from said switching network to said first cellsite controller via said rate adapter and said communication channel carrying multiple coded information signals.

15. The method of claim 13 wherein the step of communicating a coded information signal from said mobile user to the first one of the cellsites comprises communicating a TDMA coded information signal.

16. The method of claim 13 wherein the step of communicating a coded information signal from said mobile user to the first one of the cellsites comprises communicating a CDMA coded information signal.

17. A cellular communication system for communicating information signals between a mobile unit and another unit coupled to said system using an allocated frequency band divided into radio channels, comprising:

a switching network;

a switch control processor connected to said switching network;

a plurality of geographically-spaced cellsites, said cellsites being grouped into a plurality of clusters;

a cellsite controller associated with each of said clusters, each of said cellsite controllers being coupled to each cellsite in the associated cluster, each of said cellsite controllers being coupled to said switching network;

a transcoder connected to said switching network;

wherein said switching network is configured such that said transcoder is accessible to any of said cellsites; and a rate adapter coupled to said switching network and said cellsite controller.

18. The cellular communication system of claim 17 further comprising:

a PSTN interface controller connected to said switching network, said other user being coupled to said system via said PSTN interface controller.

19. The cellular communication system of claim 18 further comprising:

a second transcoder connected to said switching network;

wherein said switching network is configured such that said second transcoder is accessible to any of said cellsites.

20. The cellular communication system of claim 19, wherein said first and second transcoders comprise means for converting TDMA signals to and from PCM signals.

21. The communication system of claim 20, wherein said system supports both AMPS and TDMA formats.

22. The cellular communication system of claim 19, wherein said first and second transcoders comprise means for converting CDMA signals to and from PCM signals.

23. The communication system of claim 22, wherein said system supports both AMPS and CDMA formats.

24. The cellular communication system of claim 19, wherein the first and second transcoders comprise means for converting asynchronous data signals to and from TDMA signals.

25. The cellular communication system of claim 19, wherein the first and second transcoders comprise means for converting asynchronous data signals to and from CDMA signals.

* * * * *